No. 773,178. PATENTED OCT. 25, 1904.
E. J. YOUNG.
BEET BLOCKING MACHINE.
APPLICATION FILED MAR. 7, 1904.
NO MODEL. 2 SHEETS—SHEET 1.
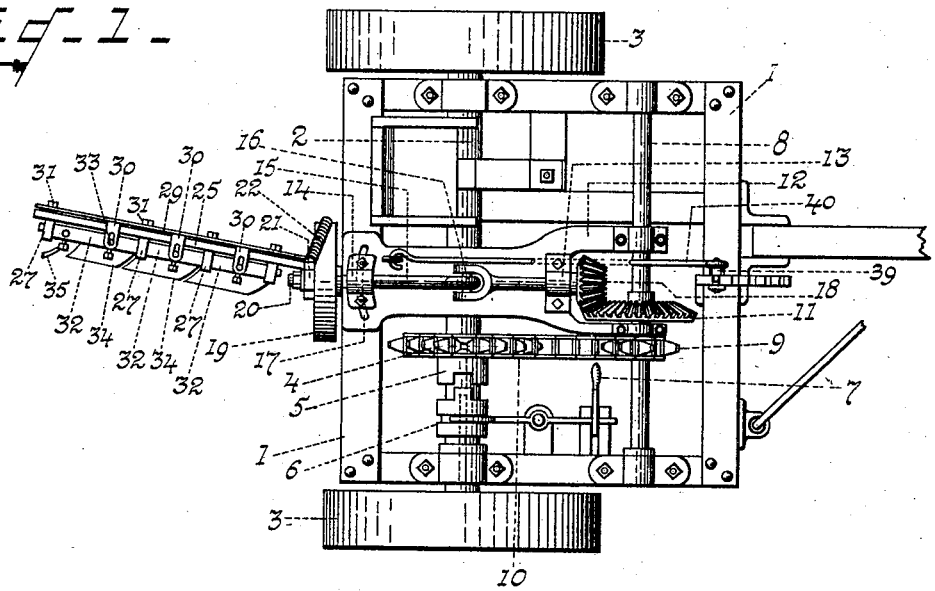
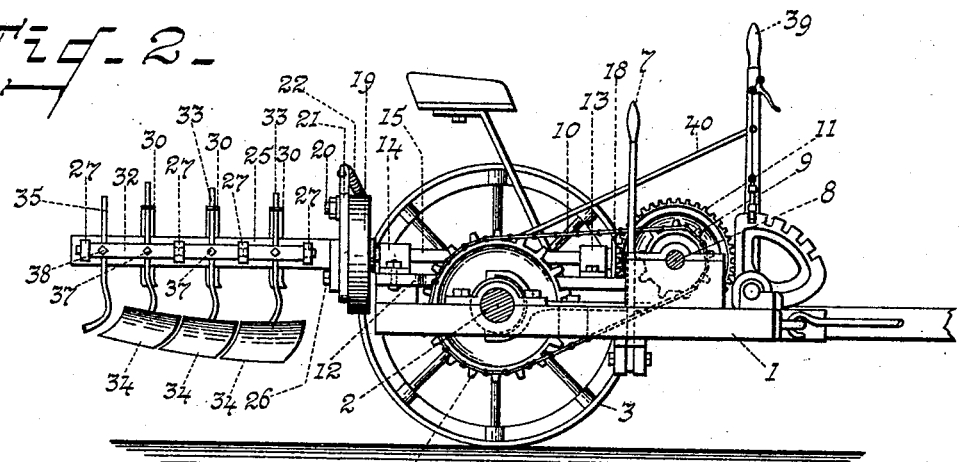
Witnesses: Inventor:
Ernest John Young,
By Frank R. Rathbun
Attorney.

No. 773,178. PATENTED OCT. 25, 1904.
E. J. YOUNG.
BEET BLOCKING MACHINE.
APPLICATION FILED MAR. 7, 1904.
NO MODEL. 2 SHEETS—SHEET 2.
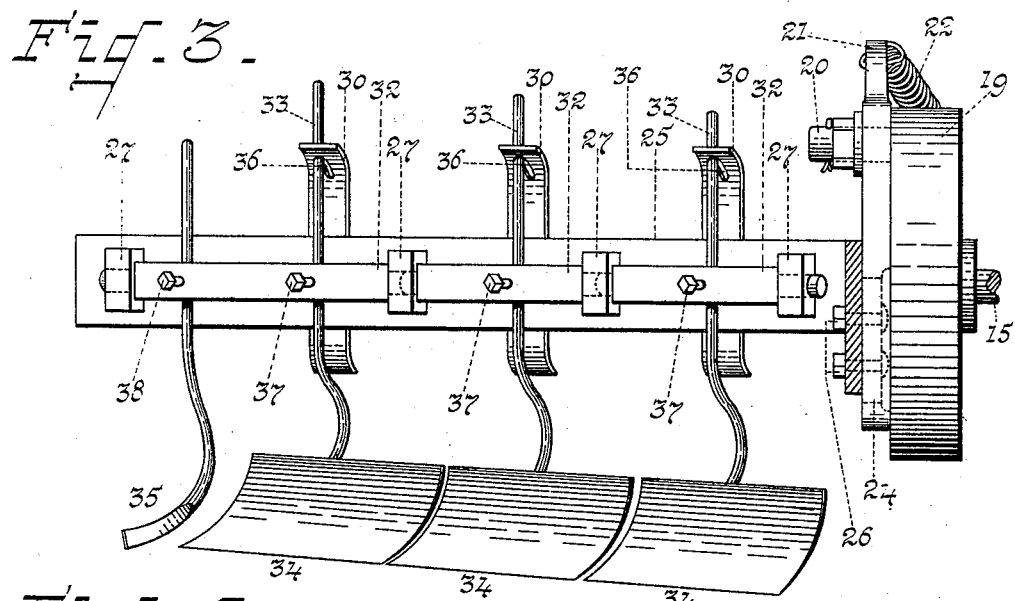
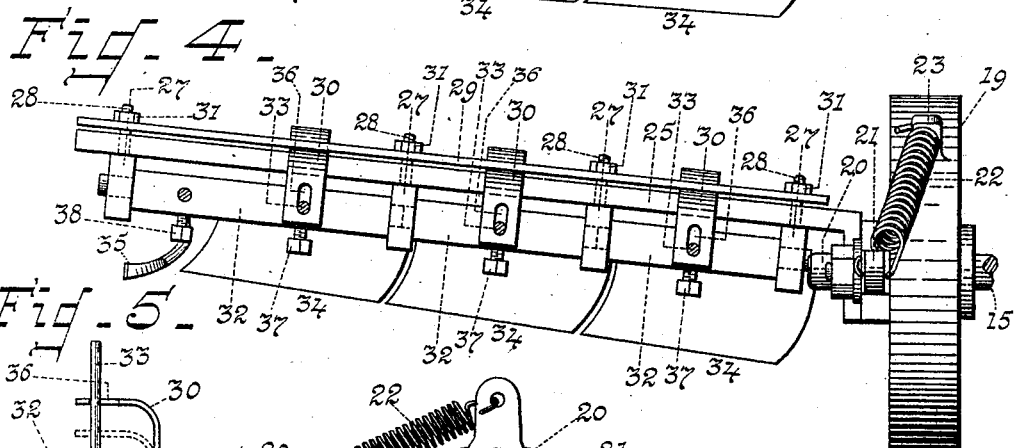
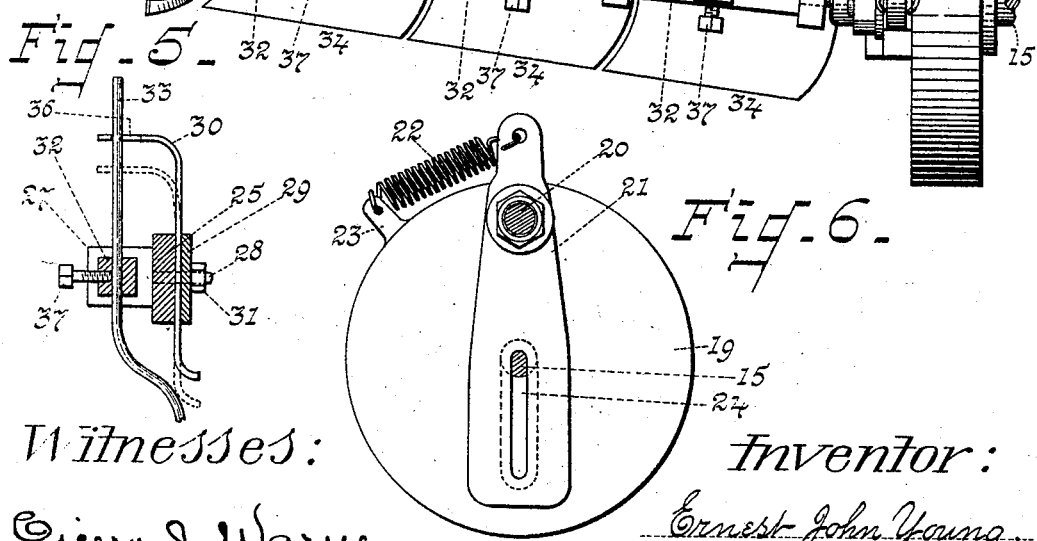
Witnesses:
Cicero J. Warne
Harry D. Burham
Inventor:
Ernest John Young,
By Frank R. Rathbun
Attorney No. 773,178.

Patented October 25, 1904.

UNITED STATES PATENT OFFICE.

ERNEST JOHN YOUNG, OF FLEMING, NEW YORK.

BEET-BLOCKING MACHINE.

SPECIFICATION forming part of Letters Patent No. 773,178, dated October 25, 1904.

Application filed March 7, 1904. Serial No. 196,945. (No model.)

*To all whom it may concern:*

Be it known that I, ERNEST JOHN YOUNG, a citizen of the United States, residing at Fleming, in the county of Cayuga and State of New York, have invented new and useful Improvements in Beet-Blocking Machines, of which the following is a specification.

My invention relates to that class of agricultural machines which are drawn along or over rows of growing vegetable crops and are provided with cutters or blades which are caused to cut away such of said growth as is undesired and leave at regular blocks or intervals the growth which is desired to grow to maturity.

The object of my invention is to provide in a vehicle driven alongside or over the said rows of growth a series of rotary cutters which will effectually and rapidly cut away such of the growth as is not desired and leave at regular blocks or intervals such of the growth as is desired to grow up and mature.

My improvement is more especially adapted to the blocking out of rows of growth of sugar and other beet and vegetable growth of a similar character. Ordinarily the seed of such growth is sown continuously in drills located from each other in parallel rows at desired intervals. When the seed has sprouted and grown to some extent, it is necessary for much of the growth to be eliminated, leaving at regular intervals that which it is desired to mature, as has already been said, and it is for this purpose that my improvement is made.

My invention is fully shown in the accompanying drawings on two sheets, in which—

Figure 1 is a plan view of my invention. Fig. 2 is a side elevation of Fig. 1 having the wheel next the point of view removed. Fig. 3 is a detail view, on an enlarged scale, of the crank-head and the standard pivoted thereon and carrying the bar which is provided with the blocking blades or cutters, the whole being shown in a side elevation. Fig. 4 is a plan view of Fig. 3. Fig. 5 is a sectional view through the blocking blade or cutter carrying bar, and Fig. 6 is an end view of the crank-head and the standard pivoted thereon.

Similar reference-figures refer to similar parts in the several views.

Referring to Fig. 1, a suitable framework 1 is provided, which is supported on a main shaft 2, having the wheels 3 3 at either end. On the main shaft 2 in a suitable position is held the large sprocket-wheel 4, which turns thereon, said sprocket-wheel 4 having a clutch 5, which engages with the clutch 6, which is movable on the main shaft 2 on a spline and is operated for engagement by the hand-lever 7 after the ordinary method. A counter-shaft 8 is provided on the framework 1 and is extended from one side to the other of the same. A smaller sprocket-wheel 9 is secured on said counter-shaft 8 opposite the larger sprocket-wheel 4, and the two are connected by the sprocket-chain 10. A bevel-gear 11 of desired size is provided and fastened in suitable position on the said counter-shaft 8. A bed-plate 12, the use of which will presently be seen, is pivoted at the forward end on the counter-shaft 8 and extended to the rear side of the framework, as shown. Near its forward end the said bed-plate 12 is furnished with a fixed box 13 and near its rear end with a movable box 14. A shaft 15, provided with a universal joint 16 near the middle of its length, is carried in the said fixed box 13 as to its forward section and in the movable box 14 as to its rearward section. The movable box 14 is so arranged as to be moved as desired over the slot 17, provided near the end of the bed-plate 12, the purpose of which arrangement of parts will presently be seen. The forward end of the shaft 15 is furnished with a bevel-pinion 18, which meshes in the large bevel-gear 11, and the outer or rear end of said shaft 15 is provided with the crank-head 19. On the crank-pin 20 of said crank-head 19 is pivoted a standard 21, its projecting top end having a spiral spring 22, the other end of which is fastened to a lug 23, provided on the periphery of the said crank-head 19, as seen plainly in Figs. 3, 4, and 6. The lower portion of the standard 21 is provided with a slot 24, which is plainly shown in Fig. 6.

Referring to Figs. 3 and 4, a bar 25 is provided, the end of which next to the crank-head 19 is turned at an angle therewith and fastened to the lower end of the standard 21 in the slot 24 by proper bolts 26. It will thus be seen that the said bar 25 is secured to said standard 21 at a slight angle, as plainly seen in Fig. 4, although it will be evident it can be secured thereto at a right angle, if so desired. The said bar 25 is provided at convenient intervals with the boxes 27, which have threaded shanks 28, which pass through the bar 25, and a tiepiece 29, between which and the bar are carried the springs, the several parts being held in desired position by the nuts 31, which screw on the shanks 28 of the boxes 27. Between the said boxes are pivoted the swing-pieces 32, which carry the shanks 33 of the blocking blades or cutters 34, attached thereto, the outer swing-piece being extended sufficiently to also carry a thinning prong or tooth 35. The said springs 30 are provided at their top ends with a slot 36, through which pass the shanks 33 of the blocking blades or cutters 34, as plainly shown in Figs. 3, 4, and 5. The said shanks 33 are held in desired place in the swing-pieces 32 by the set nuts and screws 37, and the thinning prong or tooth 35 is similarly held in desired place by the set nut and screw 38, as plainly seen in the several figures referred to.

The springs are practically of the shape shown and are extended below the bar 25 sufficiently so that the lower end of the same may be utilized as spring-stops against the shanks of the blocking blades or cutters, as shown in dotted lines in Fig. 5, if such a procedure is deemed necessary, the office of said springs being to relieve the shanks when the blocking blades or cutters strike stones or other obstructions in the ground while operating. The spiral spring 22 is also utilized for relieving the bar 25 and its several appliances as a whole when the blocking blades or cutters meet obstructions in the ground during their operation.

A tilting or lifting lever 39 is provided at the forward part of the framework, its bottom end being pivoted to a notched quadrant after the usual manner. A connecting-rod 40 connects the said lever 39 with the bed-plate 12, the forward end of which is pivoted on the counter-shaft 8, as has been described. By this arrangement the bed-plate carrying the shaft 15, having the crank-head 19 and its connected parts, as mentioned, may be tilted or raised from the ground when desired or when the machine is being hauled from place to place.

Having thus described the several parts of my improvement, I will now set forth the operation of the same.

The machine is drawn forward with its wheels on either side of the drill or row of growth to be blocked or cut out. As it progresses the main axle turns and the clutch thereon being thrown in engagement with the clutch of the large sprocket-wheel causes it to turn and through the chain connecting it with the small sprocket-wheel on the counter-shaft the latter revolves and with it the large bevel gear fastened thereon, which, engaging with the bevel-pinion on the shaft having the universal joint, causes the latter to rotate, together with the crank-head fastened on its rear end. As the said crank-head rotates it carries with it the standard pivoted on its crank-pin and the bar connected therewith, which carries the blocking blades or cutters and the several appliances connected therewith, as already described in detail. In the several drawings these latter are shown at their highest point from the ground, the crank-pin of the crank-head being at its highest throw. It will be seen that as the crank-head rotates the blocking blades or cutters are brought nearer and nearer to the ground until at its lowest point, where they enter it and cut out and away a portion of the drill or growth equal in width to the combined width of the blocking blades or cutters and leaving a small portion of the growth at the rear end, through which the thinning prong or tooth near the end of the bar is forced, thus loosening the earth about the same and adapting it for the final thinning and preservation of the growth desired to pass to maturity, which is readily accomplished by hand. It will be observed that the adjustment of the rear section of the shaft having the universal joint carried in the movable box over the slot at the rear end of the bed-plate affects the horizontal position of the bar mentioned and that means also is afforded in the slot at the bottom of the standard pivoted on the crank-head for its vertical adjustment; also, that the shanks of the blocking blades or cutters are adjustable in the swing-pieces carried on the bar, and thus a wide range of adjustment is afforded in the several parts for doing the most effective work. It will be observed that the amount of the growth left for cultivation to maturity is dependent on the speed of the crank-head and blocking blades or cutters and that the distance or spacing of said blocking may be varied by suitable changes in the sprocket-wheels or gearing, as desired.

Having thus described my invention in detail and the operation of the same, what I claim as new, and desire to secure by Letters Patent of the United States, is—

1. In a beet-blocking machine a laterally-adjustable crank-head having a bar adjustable thereon provided with suitable blocking blades or cutters adjustable therewith and having springs and a thinner prong or tooth substantially constructed in the manner and for the purpose herein shown and described.

2. In a beet-blocking machine a pivoted bed-plate having a fixed box at one end, a movable box at the other end, carrying a shaft having a universal joint and a crank-head having a lug and crank-pin combined with a standard pivoted on said crank-pin, having a slot at its bottom end and provided with a spiral spring between its upper end and the said lug on said crank-head substantially in the manner and for the purpose herein specified and shown.

3. In a beet-blocking machine a pivoted bed-plate having a fixed box at one end, a movable box at the other end carrying a shaft having a universal joint and a crank-head having a lug and crank-pin and a standard pivoted on said crank-pin having a slot at its bottom end and a spiral spring between its upper end and the said lug on said crank-head combined with a bar having the boxes 27, the swing-pieces 32, carrying the shanks 33, of the blocking blades or cutters 34, and the thinner prong or tooth 35, adjustable in said swing-pieces and the springs 30, having the slots 36, and the tie-piece 29, substantially constructed and arranged in the manner and for the purpose herein specified and shown.

In testimony whereof I have signed my name to this specification in the presence of two subscribing witnesses.

ERNEST JOHN YOUNG.

Witnesses:
FRANK R. RATHBUN,
MARK CONKLIN.